United States Patent
Li et al.

(10) Patent No.: US 10,643,029 B2
(45) Date of Patent: May 5, 2020

(54) MODEL-BASED AUTOMATIC CORRECTION OF TYPOGRAPHICAL ERRORS

(71) Applicant: Tencent Technology (Shenzhen) Company Limited, Shenzhen (CN)

(72) Inventors: Lou Li, Shenzhen (CN); Qiang Cheng, Shenzhen (CN); Feng Rao, Shenzhen (CN); Li Lu, Shenzhen (CN); Xiang Zhang, Shenzhen (CN); Shuai Yue, Shenzhen (CN); Bo Chen, Shenzhen (CN); Duling Lu, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 0 days.

(21) Appl. No.: 16/133,440

(22) Filed: Sep. 17, 2018

(65) Prior Publication Data

US 2019/0102373 A1     Apr. 4, 2019

Related U.S. Application Data (63) Continuation of application No. 14/106,642, filed on Dec. 13, 2013, now abandoned, which is a (Continued)

(30) Foreign Application Priority Data

Jan. 29, 2013  (CN) .......................... 2013 1 0033697

(51) Int. Cl.
  *G06F 40/232*  (2020.01)

(52) U.S. Cl.
  CPC ................................. *G06F 40/232* (2020.01)

(58) Field of Classification Search
  CPC ............................ G10L 15/187; G06F 3/0237
  (Continued)

(56) References Cited

U.S. PATENT DOCUMENTS

| 5,828,991 A | 10/1998 | Skiena et al. |
| 7,181,471 B1 | 2/2007 | Ibuki et al. |

(Continued)

FOREIGN PATENT DOCUMENTS

| CN | 1169199 A | 12/1997 |
| CN | 1387650 A | 12/2002 |

(Continued)

OTHER PUBLICATIONS

Tencent Technology, ISR, PCT/CN2013/086152, Jan. 23, 2014, 3, pgs.

(Continued)

*Primary Examiner* — Jakieda R Jackson
(74) *Attorney, Agent, or Firm* — Morgan, Lewis & Bockius LLP (57) ABSTRACT

A method is performed at a computer for automatically correcting typographical errors. The computer selects a target word in a target sentence and identifies a target word therein as having a typographical error and first and second sequences of words separated by the target word as context. After identifying, among a database of grammatically correct sentences, a set of sentences having the first and second sequences of words, each sentence including a replacement word, the computer selects a set of candidate grammatically correct sentences whose corresponding replacement words have similarities to the target word above a pre-set threshold, Finally, the computer chooses, among the set of candidate grammatically correct sentences, a fittest grammatically correct sentence according to a linguistic model and replaces (Continued)

the target word in the target sentence with the replacement word within the fittest grammatically correct sentence.

20 Claims, 6 Drawing Sheets

Related U.S. Application Data continuation of application No. PCT/CN2013/086152, filed on Oct. 29, 2013.

(58) Field of Classification Search
USPC .................................................. 704/2, 8, 9
See application file for complete search history.

(56) References Cited

U.S. PATENT DOCUMENTS

| 7,194,684 | B1 | 3/2007 | Shazeer |
| 7,853,874 | B2 | 12/2010 | Schabes et al. |
| 2002/0120647 | A1 | 8/2002 | Amano |
| 2006/0206331 | A1 | 9/2006 | Hennecke et al. |
| 2007/0022114 | A1 | 1/2007 | Hasegawa et al. |
| 2007/0074131 | A1 | 3/2007 | Assadollahi |
| 2007/0106685 | A1 | 5/2007 | Houh et al. |
| 2012/0284308 | A1 | 11/2012 | Oaduroiu |
| 2012/0310626 | A1 | 12/2012 | Kida et al. |

FOREIGN PATENT DOCUMENTS

| CN | 1489740 | A | 4/2004 |
| CN | 101256462 | A | 9/2008 |
| CN | 101266520 | A | 9/2008 |
| CN | 102884518 | A | 1/2013 |

OTHER PUBLICATIONS

Tencent Technology, Written Opinion, PCT/CN2013/086152, dated Jan. 23, 2014, 4, pgs.

Tencent Technology, IPRP, PCT/CN2013/086152, Aug. 4, 2015, 5, pgs.

MODEL-BASED AUTOMATIC CORRECTION OF TYPOGRAPHICAL ERRORS

CROSS-REFERENCE TO RELATED APPLICATIONS

This application is a continuation application of U.S. patent application Ser. No. 14/106,642, filed on Dec. 13, 2013, which is a continuation application of PCT application No. PCT/CN2013/086152, filed on Oct. 29, 2013, which application claims priority to Chinese Patent Application No. 201310033697.8, filed Jan. 29, 2013.

TECHNICAL FIELD

The present application relates to the technical field of information processing, especially relates to method system for model-based automatic correction of typographical errors.

BACKGROUND

There are often error character strings, such as wrongly written or mispronounced characters and mis-spelled words, in the text used in daily work and life. How to recognize and correct the error character strings in the text by a computer is a technical problem to be solved in the current technical field of information processing.

At present, there exist text correction programs based on language rules.

Specifically, in the programs, the language rules such as word collocation rules and word spelling rules of target language (i.e. the language adopted by target document) are summarized preliminarily. For example, when the target language is Chinese, the word collocation rules of Chinese will be summarized preliminarily, then according to the preliminarily summarized language rules to evaluate the text to be processed and judge whether the text to be processed conforms to the preliminarily summarized language rules. When the evaluating result shows that the conformity of text to be processed with the preliminarily summarized language rules does not meet the predetermined requirements, the program conducts error correction processing for the text to be processed according to the preliminarily summarized language rules.

It can be seen that the conventional text error correction program based on language rules not only needs a lot of working personnel with abundant language background to summarize a mass of language rules. But due to the complex structure of language itself, it is not easy to summarize language rules, and there are often conflicts between different summarized language rules. Therefore, the error recall rate of text error correction program based on language rules is low and the accuracy of error correction is also low.

SUMMARY

The present application provides a text-processing method and apparatus based on context information of a word in a sentence to improve upon the accuracy and comprehensiveness of existing text-processing methods.

In accordance with some embodiments of the present application, a computer-implemented method is performed at a device having one or more processors and memory storing programs executed by the one or more processors. The method comprises: selecting a target word in a target sentence by first predefined criteria; from the target sentence, acquiring a first sequence of words that precede the target word and a second sequence of words that succeed the target word; from a sentence database, searching and acquiring a group of words, each of which separates the first sequence of words from the second sequence of words in a sentence; from the group of words, selecting candidate words whose similarity to the target word is above a pre-set threshold according to second predefined criteria; creating a candidate sentence for each of the candidate words by replacing the target word in the target sentence with each of the candidate words; determining the fittest sentence among the candidate sentences according to a linguistic model; and suggesting the candidate word within the fittest sentence as a correction.

In accordance with some embodiments of the present application, a text-processing device comprises one or more processors: memory; and one or more programs stored in the memory and to be executed by the processor. The one or more programs include instructions for: selecting a target word in a target sentence by first predefined criteria; from the target sentence, acquiring a first sequence of words that precede the target word and a second sequence of words that succeed the target word; from a sentence database, searching and acquiring a group of words, each of which separates the first sequence of words from the second sequence of words in a sentence; from the group of words, selecting candidate words whose similarity to the target word is above a pre-set threshold according to second predefined criteria; creating a candidate sentence for each of the candidate words by replacing the target word in the target sentence with each of the candidate words; determining the fittest sentence among the candidate sentences according to a linguistic model; and suggesting the candidate word within the fittest sentence as a correction.

BRIEF DESCRIPTION OF THE DRAWINGS

The aforementioned features and advantages of the invention as well as additional features and advantages thereof will be more clearly understood hereinafter as a result of a detailed description of preferred embodiments when taken in conjunction with the drawings.

Like reference numerals refer to corresponding parts throughout the several views of the drawings.

DESCRIPTION OF EMBODIMENTS

Reference will now be made in detail to embodiments, examples of which are illustrated in the accompanying drawings. In the following detailed description, numerous specific details are set forth in order to provide a thorough understanding of the subject matter presented herein. But it will be apparent to one skilled in the art that the subject matter may be practiced without these specific details. In other instances, well-known methods, procedures, components, and circuits have not been described in detail so as not to unnecessarily obscure aspects of the embodiments.

In accordance with some embodiments of the present application, a text-processing program conducts the error correction processing according to the context information of a character string. Specifically, the program recognizes the error character strings appearing in some contexts by the similarity analysis of correct character strings and character strings to be processed with the same context information, and replaces the error character strings appearing in some contexts with corresponding correct charter strings. For recognition and correction purpose, a character string is usually a word consisting of one or more characters.

In accordance with some embodiments, the error correction model can be established in advance according to the context information of character strings and similarity among character strings, during the practical error correction process of text to be processed, conduct the error correction processing according to the error correction rules of the error correction model. It can also recognize error character string and replace the error character string with corresponding correct character string based on context information of a character string and similarity among character strings during the practical error correction process of text to be processed.

Figure 1:
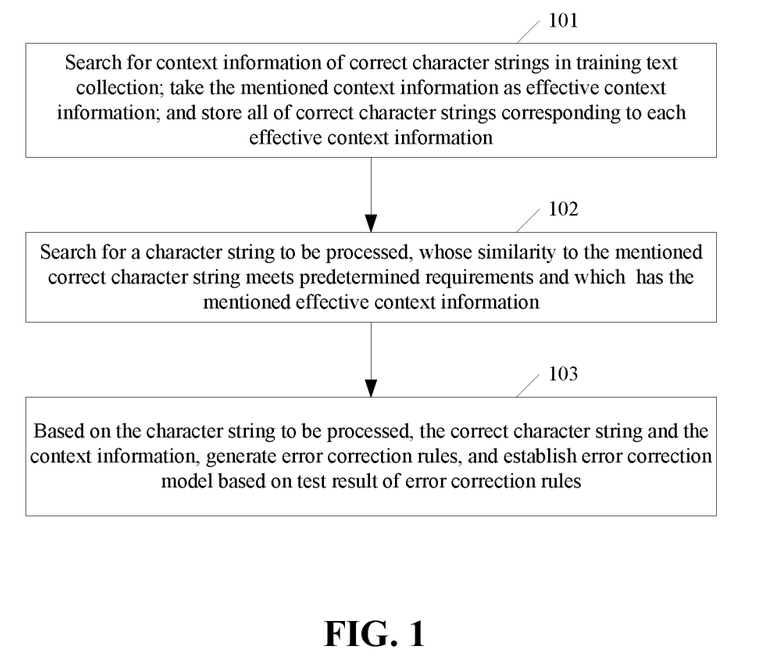
FIG. 1 is a flowchart of a method of training error correction model in accordance with some embodiments.

FIG. 1 is a flowchart of a method of training error correction model in accordance with some embodiments.

As shown in FIG. 1, this first flowchart diagram includes:

Step 101, searching for context information of a correct character string in training text collection; taking the mentioned context information as effective context information; and storing all of correct character strings corresponding to each effective context information.

Step 102, searching for the character strings to be processed whose similarity to correct character strings meeting the predetermined requirement and having the mentioned effective context information in the training text collection.

Step 103, generating error correction rules according to the character strings to be processed, the correct character strings whose similarity to character strings to be processed meet the predetermined requirements and shared effective context information of character strings to be processed and correct character strings, and establishing error correction model according to the test result of error correction rules.

Figure 2:
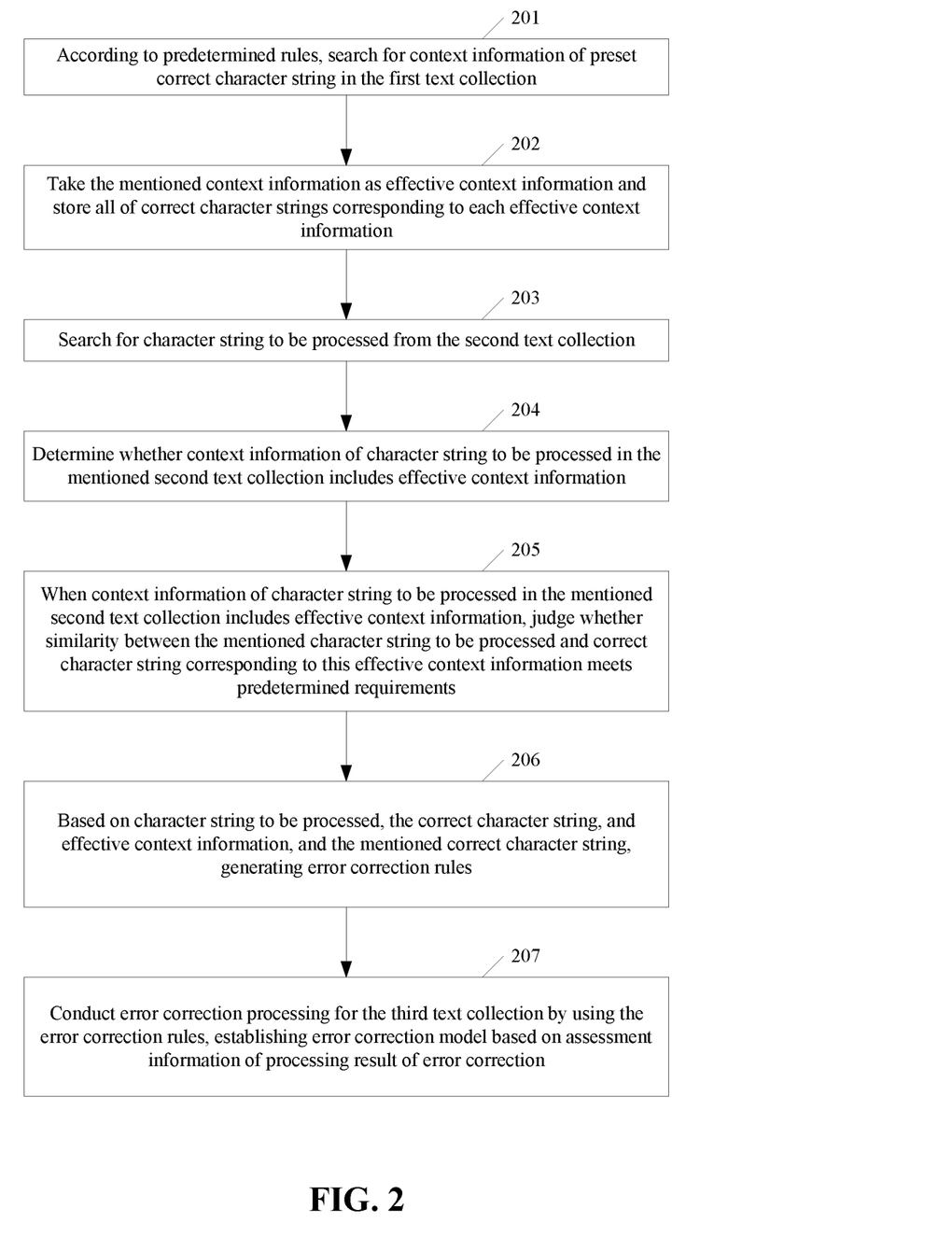
FIG. 2 is a flowchart of a method of training error correction model in accordance with some embodiments.

Among which, the mentioned training text collection can include the first text collection, the second text collection and the third text collection, the training method shown in FIG. 1 can also be further specified, and refer to the flowchart shown in FIG. 2 for more information.

FIG. 2 is a flowchart of a method of training error correction model in accordance with some embodiments.

As is shown in FIG. 2, the method includes:

Step 201, according to predetermined rules, searching for context information of a preset correct character string in the first text collection.

In accordance with some embodiments, a text-processing program generally takes the words in preset dictionary as correct character strings. Yet other methods to determine correct character strings are acceptable as well. Words can include words or phrases formed by multiple characters, or a single character.

Step 202, taking the mentioned context information as effective context information, storing all of correct character strings corresponding to each effective context information.

In this step, all of the effective context information corresponding to each correct character string can also be stored for convenience of searching for all of the effective context information corresponding to specified correct character string.

Step 203, searching for the character string to be processed from the second text collection.

In this step, to limit the scope of the character string to be processed so as to accelerate the establishment of error correction model, the text-processing program can search for the character string to be processed in the mentioned length scope from the training text collection according to the length scope of words in the mentioned predetermined dictionary.

Step 204, determining whether context information of the character string to be processed in the second text collection includes effective context information.

In this step, according to the mentioned predetermined rules, the text-processing program searches for the context information of the character string to be processed from the training text collection, and judges whether the context information of the character string to be processed is the mentioned effective context information according to the matching effect between context of the character string to be processed and effective context.

The character matching algorithm can be adopted to match the context of the character string to be processed with effective context directly, or match after transferring the context of the character string to be processed and effective context into other equivalent information.

Step 205, when context information of the character string to be processed in the second text collection includes effective context information, text-processing program judges whether similarity between the character string to be processed and the correct character string corresponding to this effective context information meets predetermined requirements.

When judging whether the similarity between the character string to be processed and the correct character string with the same effective context information meets predetermined requirements, the text-processing program judges according to the pronunciation of the character string to be processed and correct character string, or judge according to the character pattern of the character string to be processed and correct character string. For example, if the pronunciation or character pattern is similar, then the character string to be processed and the correct character string are determined to be similar strings with each other.

Specifically, for the character string to be processed and the correct character string with the same effective context information, the text-processing program judges whether the similarity of the pronunciation of the character string to be processed and pronunciation of mentioned correct string meets predetermined requirements according to the pronunciation dictionary. If the pronunciations are similar, the character string to be processed and the correct character string are determined to be similar strings with each other.

Alternatively, for the character string to be processed and the correct character string with the same effective context information, judge whether the similarity of the character pattern of the character string to be processed and character pattern of mentioned correct string meets predetermined requirements. If yes, the character string to be processed and the correct character string are determined to be similar strings with each other.

Step 206, based on the character string to be processed and the correct character string with mutual similarity meeting predetermined requirements, as well as the shared effective context information by the character string to be processed and the correct character string, text-processing program generates error correction rules to be tested.

For each pair of the character string to be processed and the correct character string with the same effective context information and whose mutual similarity meets predetermined requirements, the error correction rules to be tested include: the first error correction rules used for replacing the character string to be processed with the correct character string whose mutual similarity meets predetermined requirements, and/or, the second error correction rules used for replacing the character string to be processed and its effective context information with the correct character string and the effective context information whose similarity with the character string to be processed meet predetermined requirements (i.e., the similarity is above a pre-set threshold) and has the effective context information.

In another word, each pair of the character string to be processed and the correct character string with the same effective context information and whose mutual similarity meets predetermined requirements has one first error correction rule and more than one second error correction rule. When the character string to be processed and the correct character string have more than two pieces of same effective context information, the character string to be processed and the correct character string and each of the shared effective context information can combine into different second error correction rules.

For example, a correct character string B has effective context C and D in the first text collection. A character string A to be processed also has effective context C and D in the second text collection. And the similarity of the character string A to be processed and the correct character string B meets predetermined requirements. Then the error correction rules corresponding to the character string A to be processed and the correct character string B include: replacing the character string A to be processed with the correct character string B; replacing the character string A to be processed and its context C with correct character string B and its context C; and replacing the character string A to be processed and its context D with the correct character string B and its context D.

Step 207, conducting error correction processing for the third text collection by using the error correction rules to be tested, establishing error correction model based on assessment information of processing result of error correction. The error correction model should include error correction rules by which assessment information of its processing result of error correction meets predetermined conditions.

In this step, for each pair of the character string to be processed and the correct character string with the same effective context information and whose mutual similarity meets predetermined requirements searched out in Step 205, according to the first error correction rules, the text-processing program replaces the character string to be processed in the training text collection with the correct character string to obtain the first replacing result and judges whether the assessment result of the first replacing result meets predetermined conditions. If the predetermined conditions are met, the first error correction rules pass the assessment. If not, the first error correction rules are dropped.

Based on the second error correction rules, the text-processing program replaces the character string to be processed in the third text collection and its effective context information with the correct character string and effective context information. Then the text-processing program judges whether the assessment result of the second replacing result meets predetermined conditions. If the predetermined conditions are met, the second error correction rules are passed. If not, the second error correction rules are dropped. The error correction model includes the mentioned passed error correction rules. The established error correction model includes the mentioned passed error correction rules.

For each pair of the character string to be processed and the correct character string with the same effective context information and whose mutual similarity meets predetermined requirements searched out in Step 205. If the first error correction rules corresponding to the character string to be processed and the correct character string can pass the assessment, then it is generally unnecessary to assess other error correction rules corresponding to the character string to be processed and correct character string.

The present application does not limit the specific method of assessment for the replaced results. For example, the replaced results can be assessed according to language rules, pre-established language model. The replaced results can also be assessed manually.

In the present application, the context information of the character string includes the text in front of the character string (context information in front of string for short) and the text after the character string (context information after string for short).

For any target character string (for example, this target character string is a certain correct character string, or a certain character string to be processed), there are many methods to determine the context information of this target character string. For example: the character string with predetermined length in front of and/or after the target character string can be determined as the context information of the mentioned target character string; or, according to the several predetermined words emerged before and/or after dictionary searching for target character string, the mentioned several predetermined words are determined as the context information of the mentioned target character string; or, according to the semantic features of the target character string, select context information for the mentioned target character string based on the predetermined language rules. The mentioned all kinds of methods to determine the context information of the target character string can be used separately, or in combination with each other.

For the text collection used in the method shown in FIG. 2, the first text collection, the second text collection and the mentioned third text collection can be the same one, among which include certain proportional error character strings, but the most are correct character strings.

Alternatively, the first text collection can be the text collection different with the second text collection and the third text collection. The accuracy of the text in the first text collection is higher than the accuracy of the text in the second text collection and third text collection. The second text collection and the mentioned third text collection can be the same text collection or different text collections. The more abundant and the broader the anticipated resource of the text collections used in the method shown in FIG. 2 is, the better the error correction effect of the established error correction model are.

Figure 3:
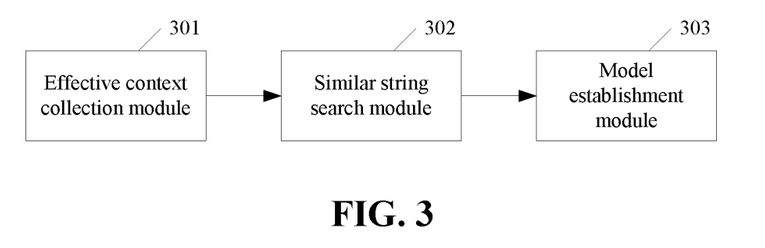
FIG. 3 is a schematic structural diagram of a text-processing device in accordance with some embodiments.

FIG. 3 is a schematic structural diagram of a text-processing device in accordance with some embodiments.

As shown in FIG. 3, this device includes effective context collection module 301, similar string search module 302 and model establishment module 303.

Effective context collection module 301 is configured to search the context information of a correct character string in the training text collection, and use the mentioned context information as the effective context information to store all correct character strings corresponding to each effective context information.

Similar string search module 302 is configured to search the character strings to be processed in the training text collection. The similarity between the character strings to be processed and the correct character strings must satisfy the predetermined requirements and have the effective context information.

Model establishment module 303 is configured to generate error correction rules according to the character strings to be processed, the correct character strings whose similarity to character strings to be processed meet the predetermined requirements and shared effective context information of character strings to be processed and correct character strings, and establish error correction model according to the test result of error correction rules.

Effective context collection module 301 is configured to search the context information of the preset correct character strings in the first text collection based on the predetermined rules, and use the mentioned context information as the effective context information to store all correct character strings corresponding to each effective context information.

Similar string search module 302 is configured to search the character strings to be processed from the second text collection, and determine whether the context information of the character strings to be processed in the second text collection include effective context information. Also, string search module 30 is configured to judge whether the similarity of the character strings to be processed and the correct character strings corresponding to the effective context information satisfies the predetermined requirements or not.

Model establishment module 303 is also configured to generate error correction rules to be tested based on the common effective context information of character strings to be processed and correct character strings, the character strings to be processed and the correct character strings that the similarities among them have satisfied the predetermined requirements, and use the error correction rules to be tested to conduct error correction processing for the third text collection, to establish error correction model based on the assessment information for error correction processing results, the error correction model includes the error correction rules that the assessment information of its error correction processing results satisfies the predetermined conditions.

The error correction rules to be tested include: the first error correction rules used for replacing the character string to be processed with the correct character string whose mutual similarity meets predetermined requirements, and/or, the second error correction rules used for replacing the character string to be processed and its effective context information with the correct character string and mentioned effective context information whose similarity with the character string to be processed meet predetermined requirements and has the mentioned effective context information.

The mentioned preset correct character strings can include the words in the preset dictionary.

Similar string search module 302 is configured to search the character strings to be processed within the scope of the mentioned length from the training text collection based on the length scope of the words in the mentioned predetermined dictionary.

Similar string search module 302 is configured to search for the context information of the character string to be processed from the training text collection according to the mentioned predetermined rules, and judge whether the context information of the character string to be processed is the mentioned effective context information according to the matching effect between context of the character string to be processed and effective context.

The mentioned context information includes the context information in front of string and/or the context information after string.

The mentioned predetermined rules for searching context information include: the character strings with predetermined length in front of and/or after the target character string are determined as the context information of the mentioned target character string; or, searching the several predetermined words emerged before and/or after the target character string according to dictionary, the mentioned several predefined words are determined as the context information of the mentioned target character string; or, according to the semantic features of the target character string, select context information for the mentioned target character string based on the predetermined language rules.

Similar string search module 302 is configured to judge whether the similarity between the pronunciation of the character string to be processed and the pronunciation of the correct character string meets predetermined requirements according to pronunciation dictionary. In addition, similar string search module 302 is configured to judge whether the similarity between the glyph of the character string to be processed and the glyph of the correct character string meets predetermined requirements according to glyph dictionary.

Model establishment module 303 is configured, according to the character strings to be processed and the correct character strings that the similarities among them have satisfied the predetermined requirements, to replace the character string to be processed in the training text collection with the correct character string to obtain the first replacing result according to the first error correction rules, judge whether the assessment result of the first replacing result meets predetermined conditions. If the predetermined conditions are met, the first error correction rules pass the assessment. If no, the first error correction rules are dropped In addition, the model establishment module 303 is configured to replace the character string to be processed in the training text collection and its effective context information with the correct character string and effective context information to obtain the second replacing result according to the second error correction rules. The model establishment module 303 is further configured to judge whether the assessment result of the second replacing result meets predetermined conditions. If yes, the second error correction rules pass assessment. If not, the second error correction rules are dropped. The established error correction model includes the mentioned passed error correction rules.

The first text collection, the second text collection and the mentioned third text collection are the same one. Alternatively, the accuracy of the text in the first text collection is higher than the accuracy of the text in the second text collection and the third text collection. The second text collection and the mentioned third text collection can be the same text collection or different text collections.

Based on the aforementioned methods of training error correction model provided by the present application, the present application also provides a kind of text error correction method, in the text error correction method, according to the error correction rules stored in the error correction model, search character strings from the text to be processed, conduct error correction processing for the searched character strings according to the error correction rules.

Figure 4:
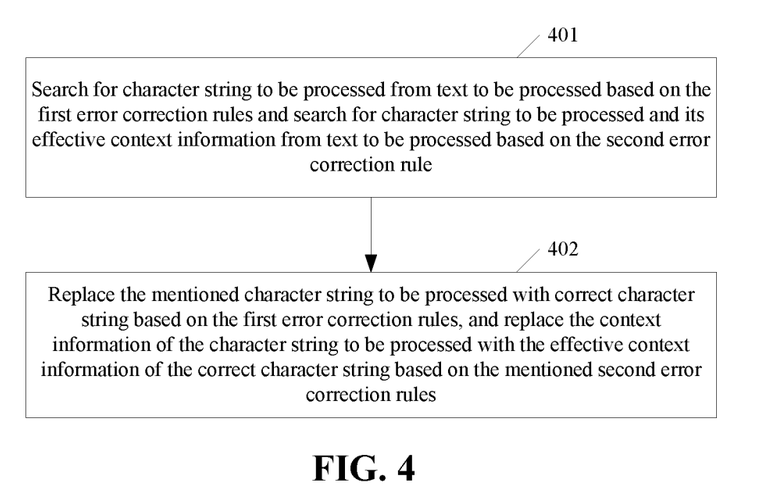
FIG. 4 is a flowchart of a text-processing method in accordance with some embodiments.

The method to conduct text error correction based on the error correction model provided by the present application can also refer to FIG. 4 specifically.

FIG. 4 is a flowchart of a text-processing method in accordance with some embodiments.

As shown in FIG. 4, this flowchart diagram includes:

Step 401, the text-processing program searches for the character string to be processed from text to be processed based on the first error correction rules stored in the error correction model, and search for character strings to be processed and its effective context information from the text to be processed based on the second error correction rules stored in the error correction model.

Step 402, the text-processing program replaces a character string to be processed with the correct character string based on the first error correction rules, and based on the second error correction rules, replace the character string to be processed and its effective context information with correct character string and the mentioned effective context information whose similarity to the character string to be processed meet predetermined requirements and provided with the mentioned effective context information.

The first error correction rules include replacing the character strings to be processed that their similarity satisfies the predetermined requirements with correct character strings. The second error correction rules include replacing the character string to be processed and its effective context information with the correct character string and the mentioned effective context information that the similarity with the character strings to be process satisfies the predetermined requirements and have the mentioned effective context information. The effective context information is the context information of the correct character strings in the training text collection, the common effective context information of the character strings to be processed and the correct character strings in the mentioned training text collection that their similarity satisfies the predetermined requirements. The mentioned training text collection is the text collection configured to train the error correction model.

The device to conduct text error correction based on the error correction model provided by the present application can include error correction model module and error correction processing module.

The error correction model module is configured to store error correction rules. The error correction model is obtained by training through the following steps: searching the context information of correct character strings in the training text collection, using the mentioned context information as the effective context information to store all correct character strings corresponding to each effective context information; searching the character strings to be processed in the training text collection that the similarity with the correct character strings satisfies the predetermined requirements and have the mentioned effective context information; generating error correction rules according to the character strings to be processed, the correct character strings whose similarity to character strings to be processed satisfy the predetermined requirement and shared effective context information of character strings to be processed and correct character strings, and establishing error correction model according to the test result of error correction rules.

The error correction processing module is configured to search character strings from the text to be processed according to the error correction rules stored in the error correction model, conduct error correction processing for the searched character strings according to the error correction rules.

Figure 5:
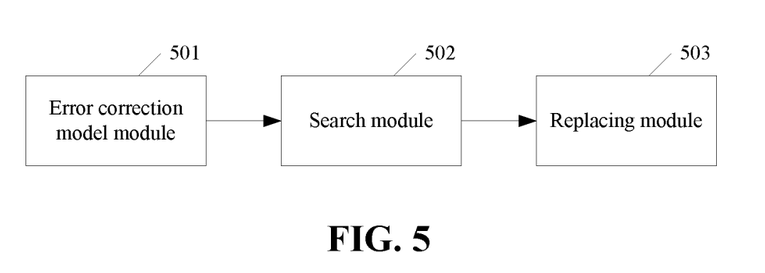
FIG. 5 is a schematic structural diagram of a text-processing device in accordance with some embodiments.

The specific structure of the device to conduct text error correction based on the error correction model provided by the present application can also refer to FIG. 5.

FIG. 5 is a schematic structural diagram of a text-processing device in accordance with some embodiments.

As shown in FIG. 5, the text error correction device includes error correction model module 501, search module 502 and replacing module 503.

Error correction model module 501 is configured to store error correction rules, the error correction rules include the first error correction rules that replace the character strings to be processed that their similarity satisfies the predetermined requirements with correct character strings, and/or the second error correction rules that replace the character string to be processed and its effective context information with the correct character string and the mentioned effective context information that the similarity with the character strings to be process satisfies the predetermined requirements and have the mentioned effective context information. The mentioned effective context information is the context information of the correct character strings in the training text collection, the common effective context information of the character strings to be processed and the correct character strings in the mentioned training text collection that their similarity satisfies the predetermined requirements. The mentioned training text collection is the text collection configured to train the error correction model.

Search module 502 is configured to search for the character string to be processed from text to be processed based on the first error correction rules, and search for character string to be processed and its effective context information from text to be processed based on the second error correction rules.

Replacing module 503 is configured to replace the character string to be processed with the correct character string based on the first error correction rules, and based on the second error correction rules, replace the character string to be processed and its effective context information with correct character string and the mentioned effective context information whose similarity to the character string to be processed meet predetermined requirements and provided with the mentioned effective context information.

As described in FIGS. 1-5, if establishing error correction model in advance based on context information of the character string and similarity among character strings, during practical error correction process of text to be processed, when conducting error correction processing directly based on error correction rules in error correction model, as allowing to conduct searching and matching of context information of the character string as well as judgment of similarity among character strings, the evaluation of error correction rules and other tasks during establishing error correction model, the actual error correction speed of text to be processed will be thus greatly accelerated.

Figure 6:
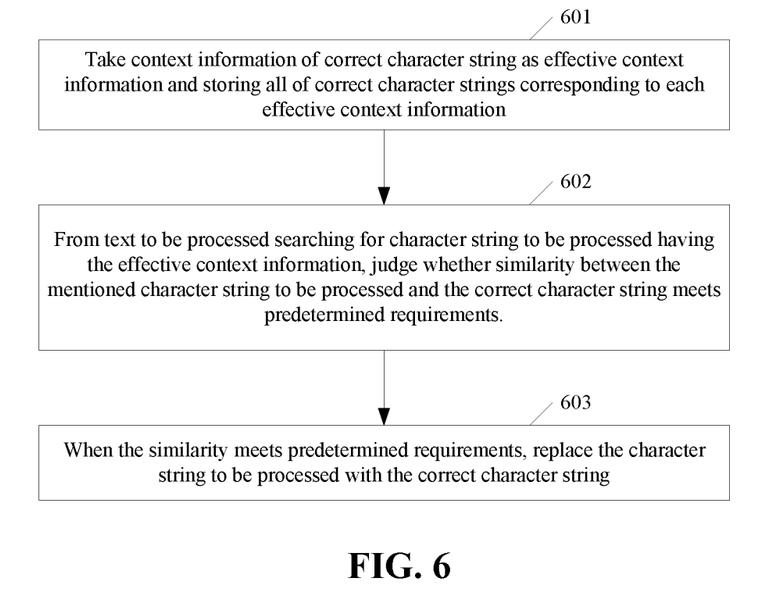
FIG. 6 is a flowchart of a text-processing method in accordance with some embodiments.
Figure 7:
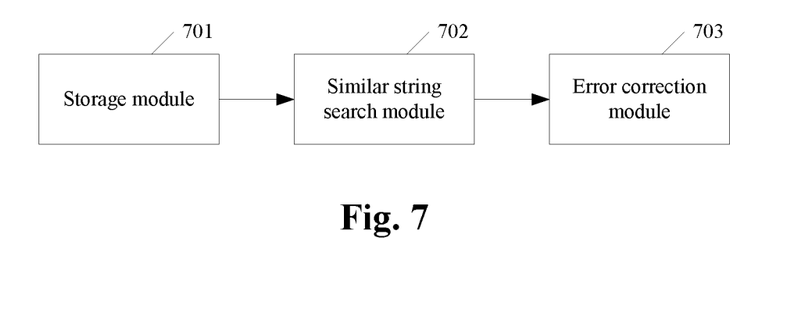
FIG. 7 is a schematic structural diagram of a text-processing device in accordance with some embodiments.

The present application enables to recognize error character strings and replace an error character string with a corresponding correct character string based on context information of the character string and similarity among character strings during the practical error correction process of text to be processed, refer to FIG. 6-FIG. 7 for specific information.

FIG. 6 is a flowchart of a text-processing method in accordance with some embodiments.

As shown in FIG. 6, this flowchart diagram includes:

Step 601, taking context information of a correct character string as effective context information in advance, store all of correct character strings corresponding to each effective context information.

The correct character strings generally include predetermined words in dictionary, and the mentioned effective context information is context information of a correct character string in predetermined training text collection.

Step 602, searching for a character string to be processed having the mentioned effective context information in text to be processed, judging whether the similarity between the character string to be processed and the correct character string having the same effective context information as the character string to be processed meets predetermined requirements.

In this step, the text-processing program, according to pronunciation dictionary, judges whether similarity between the pronunciation of the character string to be processed and the pronunciation of the correct character string meet predetermined requirements. Alternatively, the text-processing program, according to glyph dictionary, judges whether similarity between the glyph of the character string to be processed and the glyph of the correct character string meet predetermined requirements.

Step 603, when the mentioned similarity meets predetermined requirements, replace the character string to be processed with the correct character string, or replace both the character string to be processed and the mentioned effective context information with the correct character string and the mentioned effective context information.

In this step, when the similarity meets predetermined requirements, the text-processing program replaces the character string to be processed with the correct character string for obtaining the first replacing result. When assessment result of the first replacing result meets predetermined requirements, the text-processing program determines the first replacing result as the final error correction result. When the assessment result of the first replacing result fails to meet predetermined requirements, the text-processing program replaces both the character string to be processed and the mentioned effective context information with the correct character string and the effective context information for obtaining the second replacing result. When the assessment result of the second replacing result meets predetermined requirements, the text-processing program determines the second replacing result as the final error result. When the assessment result of the second replacing result fails to meet predetermined requirements, the text-processing program keeps the character string to be processed invariable or conducting other error correction processing.

FIG. 7 is a schematic structural diagram of a text-processing device in accordance with some embodiments.

As shown in FIG. 7, this device includes storage module 701, similar string search module 702 and error correction module 703.

Storage module 701 is configured to take context information of a correct character string as effective context information in advance, store all of correct character strings corresponding to each effective context information.

Similar string search module 702 is configured to search for a character string to be processed having the mentioned effective context information from the text to be processed, judge whether similarity between the character string to be processed and the correct character string having the same effective context information as the character string to be processed meet predetermined requirements.

Error correction module 703 is configured to replace the character string to be processed with the correct character string when the mentioned similarity meets predetermined requirements, or replace both the character string to be processed and the mentioned effective context information with the correct character string and the mentioned effective context information.

Similar string search module 702 is configured, according to pronunciation dictionary, to judge whether similarity between the pronunciation of the character string to be processed and the pronunciation of the correct character string having the same effective context information as the character string to be processed meet predetermined requirements, or according to glyph dictionary, to judge whether similarity between the glyph of the character string to be processed and the glyph of the correct character string having the same effective context information as the character string to be processed meet predetermined requirements.

Error correction module 703 is configured to replace the character string to be processed with the correct character string for obtaining the first replacing result when the mentioned similarity meets predetermined requirements. The error correction module 703 is further configured to determine the first replacing result as the final error correction result when assessment result of the first replacing result meets predetermined requirements. The error correction module 703 is further configured to, when the assessment result of the first replacing result fails to meet predetermined requirements, replace both the character string to be processed and the mentioned effective context information with the correct character string and the mentioned effective context information for obtaining the second replacing result. The error correction module 703 is further configured to, when the assessment result of the second replacing result meets predetermined requirements, determine the second replacing result as the final error result.

Figure 8:
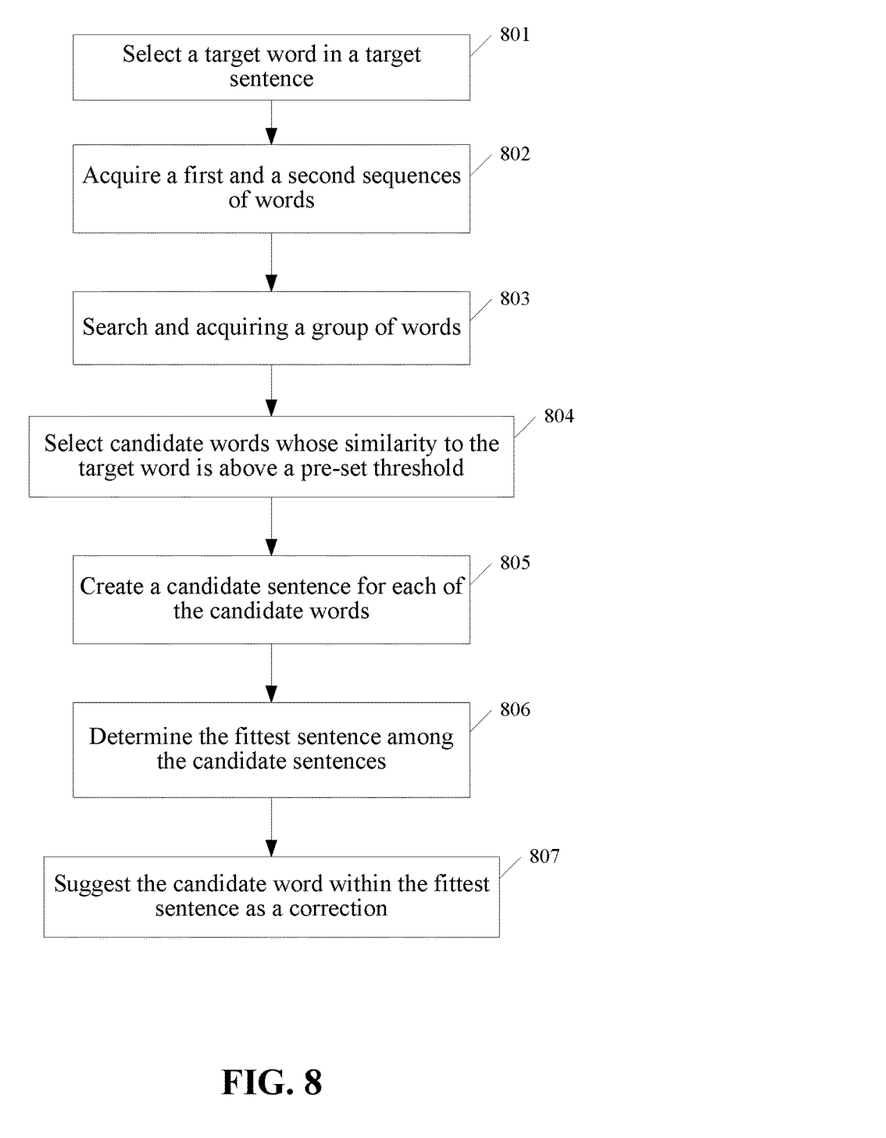
FIG. 8 is a flowchart of a text-processing method in accordance with some embodiments.
Figure 9:
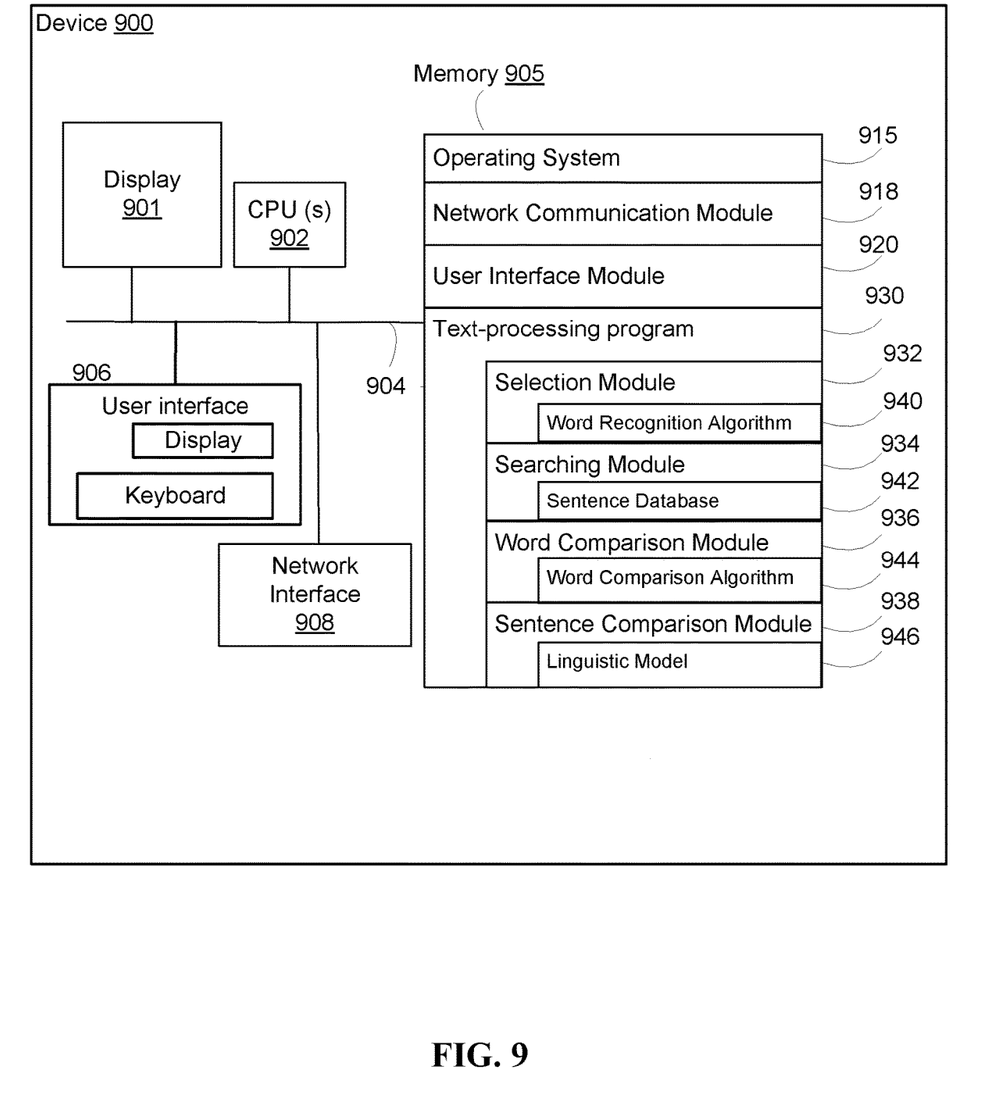
FIG. 9 is a schematic structural diagram of a text-processing device in accordance with some embodiments.

FIG. 8 is a flowchart of a text-processing method in accordance with some embodiments. The method is performed at a device (e.g., device 900 as shown in FIG. 9) having one or more processors and memory storing programs executed by the one or more processors. In some embodiments, this text-processing method is performed by an independent program processing given text. In accordance with some other embodiments, this text-processing method works as a module in, or in combination with, another text-process program or text-input program. Text-input programs include any program that receives text as input, e.g., an online chatting program.

In step 801, a text-processing program selects a target word in a target sentence by first predefined criteria. The target word and/or target sentence can be selected by the user and the first predefined criteria acknowledge user selection. In accordance with some embodiments, the text-processing program also selects a target word because the target word is deemed to be possibly wrong.

In Chinese text, a word consists of one or more Chinese characters and a recognition of a word is needed to determine whether a character string is a word. The first predefined criteria include recognizing a word having a few Chinese characters based at least on Chinese grammar. The first predefined criteria include a word recognition algorithm (as Word Recognition Algorithm 940 shown in FIG. 9) to recognize a combination of more than one character as one word.

In addition, not all words in a sentence need further processing by a text-processing method. The recognition algorithm selects a few words from a sentence for further processing in order to increase efficiency. The selected words are deemed to be more likely to be wrong than others in the target sentence. The selection is based on language rules including grammar.

In step 802, the text-processing program acquires from the target sentence a first sequence of words that precede the target word and a second sequence of words that succeed the target word.

One way of acquiring the first and second sequences of words is to acquire, from the target sentence, all words before the target word as the first sequence of words and all words behind the target word as the second sequence of words.

Another way of acquiring the first and second sequences of words is to acquire fixed lengths of words before and after the target word. The lengths can be measured by number of characters, symbols, letters, etc. What is the optimal length is an empirical question that requires repetitive testing and may be circumstance-contingent. Theoretically, long fixed lengths of words are associated with more comprehensive reflection of the role of the target word in the target sentence but also, as shown in subsequent steps, more time-consuming searching and a smaller sentence pool. In addition, the further away a word is located in the target sentence from the target word, the less value it has in the process. Therefore, a person skilled in the art can recognize a balance can be achieved through repetitive testing of different lengths.

Yet another and more complex way of acquiring the first and second sequences of words is to determine the lengths of the first and second sequences of words based on the meaning of the target word and the words before or after the target words. Based on the meaning of the target word, the program roughly determines that the meaning of the words beyond the lengths have no relationship with the meaning of the target word and exclude words beyond the lengths from the first and second sequences of words.

In step 803, the text-processing program, from a sentence database, searches and acquires a group of words, each of which separates the first sequence of words from the second sequence of words in a sentence. The program searches for sentences containing the first sequence of words, one word and the second sequence of words, in that order. The search is conducted in a sentence database that comprises millions or billions of sentences. The search result provides all sentences with the first and second sequences of words and a word separating the two sequences of words in the correct order. The text-processing program then acquires a group of words, each of which separates the first sequence of words from the second sequence of words in a sentence.

In step 804, the text-processing program, from the group of words, selects candidate words whose similarity to the target word is above a pre-set threshold according to second predefined criteria. In accordance with some embodiments, the second predefined criteria include the length of words, the pronunciations of words, the meaning of words, the ease of confusion between one word and the target word, etc.

In step 805, the text-processing program creates a candidate sentence for each of the candidate words by replacing the target word in the target sentence with each of the candidate words. Replacing the target word with candidate word creates a new candidate sentence so that the evaluation of the candidate word is conducted on a sentence level.

In step 806, the text-processing program determines the fittest sentence among the candidate sentences according to a linguistic model (e.g., the linguistic model 946 in FIG. 9). In accordance with some embodiments, the text-processing program also compares the fittest sentence with the target sentence according to the linguistic model.

In accordance with some embodiments, the linguistic model includes criteria for grammar and other language rules, the meaning of the candidate sentence, the frequency of every candidate sentence appearing in the sentence database, etc. In accordance with some embodiments, the candidate sentences are first evaluated based on whether they fit into rules of language. Some candidate sentences are eliminated because the candidate words, while exist in some sentences containing the first and second sequences of words in the sentence database, break grammar or other language rules in the target sentence. In the next step, the meaning of the candidate sentences is evaluated. If there are other sentences in the text, the model evaluates whether meanings of the candidate sentence is compatible with others. Lastly, for the remaining sentences, the model searches the frequencies of the remaining sentences appearing in the sentence database. A higher frequency of a candidate sentence indicates a higher possibility that the candidate sentence is the sentence that the writer of the target sentence intends to write.

In step 807, the text-processing program suggests the candidate word within the fittest sentence as a correction. In accordance with some embodiments, after suggesting the candidate word within the fittest sentence, the device replaces the target word in the target sentence with the suggested candidate word. Alternatively, the suggested word is shown to the user of the text-processing program as a choice.

FIG. 9 is a diagram of an example implementation of a text-processing device in accordance with some embodiments. While certain specific features are illustrated, those skilled in the art will appreciate from the present disclosure that various other features have not been illustrated for the sake of brevity and so as not to obscure more pertinent aspects of the implementations disclosed herein. To that end, the server computer 900 includes one or more processing units (CPU's) 902, one or more network or other communications interfaces 908, a display 901, memory 905, and one or more communication buses 904 for interconnecting these and various other components. The communication buses may include circuitry (sometimes called a chipset) that interconnects and controls communications between system components. The memory 905 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. The memory 905 may optionally include one or more storage devices remotely located from the CPU(s) 902. The memory 905, including the non-volatile and volatile memory device(s) within the memory 905, comprises a non-transitory computer readable storage medium.

In some implementations, the memory 905 or the non-transitory computer readable storage medium of the memory 905 stores the following programs, modules and data structures, or a subset thereof including an operating system 915, a network communication module 918, a user interface module 920, and a text-processing program 930.

The operating system 915 includes procedures for handling various basic system services and for performing hardware dependent tasks.

The network communication module 918 facilitates communication with other devices via the one or more communication network interfaces 908 (wired or wireless) and one or more communication networks, such as the internet, other wide area networks, local area networks, metropolitan area networks, and so on.

The user interface module 920 is configured to receive user inputs through the user interface 906.

The text-processing program 930 is configured to correct errors in a text, either independently or in combination with other text processing and/or text inputting program. The text-processing program 930 comprises a selection module 932, a searching module 934, a word comparison module 936 and a sentence comparison module 938.

The selection module 932 is configured to select a target word in a target sentence by first predefined criteria. The selection module 932 comprises a word recognition algorithm 940, which is configured to recognize a character string as a word having a few Chinese characters based at least on Chinese grammar. In addition, the selection module 932 is configured to determine whether any words in a target sentence has significant enough possibility of being wrong.

The searching module 934 is configured to search and acquire a group of words from a sentence database 942, each of which separates the first sequence of words from the second sequence of words in a sentence. The searching and acquiring process is illustrated in step 803 of FIG. 8 and details are not to be repeated here.

In accordance with some embodiments, the sentence database comprises text that is acquired from articles and dictionaries. The sentence database is updated periodically by acquiring sentences from internet sources. Periodic updating not only supplies more sentences but also helps to catch the ever-evolving language patterns and rules.

The word comparison module 936 is configured to select candidate words from the group of words. The similarity between a selected candidate word and the target word must be above a pre-set threshold according to second predefined criteria. The word comparison module 936 comprises word comparison algorithm 944, which is configured to carry out the second predefined criteria.

The sentence comparison module 938 is configured to determine the fittest sentence among the candidate sentences. The determination is based on a linguistic model 946. The linguistic model can comprises multiple sets of criteria as illustrated in step 806 of FIG. 8 and combines any set of criteria depending on the circumstances.

While particular embodiments are described above, it will be understood it is not intended to limit the invention to these particular embodiments. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

The terminology used in the description of the invention herein is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented method, comprising:
   at a first mobile device having one or more processors and memory storing programs executed by the one or more processors:
   displaying a user interface of an online chatting program, the user interface including chat messages exchanged between a first user at the first mobile device and a second user at a second mobile device;
   receiving, in the user interface, a chat message including a target sentence entered by the first user;
   receiving a user instruction to send the entered chat message to the second user;
   in response to the user instruction to send the entered chat message, processing the target sentence in the entered chat message by:
   identifying a target word in the target sentence as having a typographical error in accordance with first predefined criteria;
   selecting, within the target sentence, a first sequence of words that precede the target word and a second sequence of words that succeed the target word according to semantic features of the target word;

identifying, among a database of grammatically correct sentences, a set of sentences, each sentence including a replacement word that is located after the first sequence of words and before the second sequence of words like the target sentence;

selecting, from the identified set of grammatically correct sentences, a set of candidate grammatically correct sentences whose corresponding replacement words have similarities to the target word above a pre-set threshold according to second predefined criteria;

choosing, among the set of candidate grammatically correct sentences, a fittest grammatically correct sentence according to a linguistic model; and replacing, using the online chatting program, the target word in the target sentence with the replacement word within the fittest grammatically correct sentence; and transmitting, from the first mobile device, the chat message including the target sentence with the replacement word to the second mobile device for displaying the chat message on a chat interface of the online chatting program between the first user and the second user on the second mobile device.

2. The method of claim 1, wherein the first predefined criteria include whether a character string is a word based at least on Chinese grammar.

3. The method of claim 1, wherein selecting one of the first sequence of words and the second sequence of words comprises determining a length of the one of the first sequence of words and the second sequence of words based at least on a meaning of the target word.

4. The method of claim 1, wherein the first sequence of words has a length that is pre-set.

5. The method of claim 1, wherein the linguistic model includes grammatical criteria for the first sequence of words and the second sequence of words.

6. The method of claim 1, wherein the similarity between a replacement word to the target word is determined based on pronunciation similarity between the replacement word and the target word.

7. The method of claim 1, wherein the similarity between a replacement word to the target word is determined based on spelling similarity between the replacement word and the target word.

8. A first mobile device, comprising:
one or more processors;
memory; and
one or more programs stored in the memory that, when executed by the one or more processors, cause the first mobile device to perform the following operations:
displaying a user interface of an online chatting program, the user interface including chat messages exchanged between a first user at the first mobile device and a second user at a second mobile device;
receiving, in the user interface, a chat message including a target sentence entered by the first user;
receiving a user instruction to send the entered chat message to the second user;
in response to the user instruction to send the entered chat message, processing the target sentence in the entered chat message by:
identifying a target word in the target sentence as having a typographical error in accordance with first predefined criteria;
selecting, within the target sentence, a first sequence of words that precede the target word and a second sequence of words that succeed the target word according to semantic features of the target word;

identifying, among a database of grammatically correct sentences, a set of sentences, each sentence including a replacement word that is located after the first sequence of words and before the second sequence of words like the target sentence;

selecting, from the identified set of grammatically correct sentences, a set of candidate grammatically correct sentences whose corresponding replacement words have similarities to the target word above a pre-set threshold according to second predefined criteria;

choosing, among the set of candidate grammatically correct sentences, a fittest grammatically correct sentence according to a linguistic model; and replacing, using the online chatting program, the target word in the target sentence with the replacement word within the fittest grammatically correct sentence; and transmitting, from the first mobile device, the chat message including the target sentence with the replacement word to the second mobile device for displaying the chat message on a chat interface of the online chatting program between the first user and the second user on the second mobile device.

9. The first mobile device of claim 8, wherein the first predefined criteria include whether a character string is a word based at least on Chinese grammar.

10. The first mobile device of claim 8, wherein selecting one of the first sequence of words and the second sequence of words comprises determining a length of the one of the first sequence of words and the second sequence of words based at least on a meaning of the target word.

11. The first mobile device of claim 8, wherein the first sequence of words has a length that is pre-set.

12. The first mobile device of claim 8, wherein the linguistic model includes grammatical criteria for the first sequence of words and the second sequence of words.

13. The first mobile device of claim 8, wherein the similarity between a replacement word to the target word is determined based on pronunciation similarity between the replacement word and the target word.

14. The first mobile device of claim 8, wherein the similarity between a replacement word to the target word is determined based on spelling similarity between the replacement word and the target word.

15. A non-transitory computer readable storage medium, storing one or more programs for execution by one or more processors of a first mobile device, the one or more programs including instructions for:
displaying a user interface of an online chatting program, the user interface including chat messages exchanged between a first user at the first mobile device and a second user at a second mobile device;
receiving, in the user interface, a chat message including a target sentence entered by the first user;
receiving a user instruction to send the entered chat message to the second user;
in response to the user instruction to send the entered chat message, processing the target sentence in the entered chat message by:
identifying a target word in the target sentence as having a typographical error in accordance with first predefined criteria;
selecting, within the target sentence, a first sequence of words that precede the target word and a second sequence of words that succeed the target word according to semantic features of the target word;

identifying, among a database of grammatically correct sentences, a set of sentences, each sentence including a replacement word that is located after the first sequence of words and before the second sequence of words like the target sentence;

selecting, from the identified set of grammatically correct sentences, a set of candidate grammatically correct sentences whose corresponding replacement words have similarities to the target word above a pre-set threshold according to second predefined criteria;

choosing, among the set of candidate grammatically correct sentences, a fittest grammatically correct sentence according to a linguistic model; and replacing, using the online chatting program, the target word in the target sentence with the replacement word within the fittest grammatically correct sentence; and transmitting, from the first mobile device, the chat message including the target sentence with the replacement word to the second mobile device for displaying the chat message on a chat interface of the online chatting program between the first user and the second user on the second mobile device.

16. The non-transitory computer readable storage medium of claim 15, wherein selecting one of the first sequence of words and the second sequence of words comprises determining a length of the one of the first sequence of words and the second sequence of words based at least on a meaning of the target word.

17. The non-transitory computer readable storage medium of claim 15, wherein the first sequence of words has a length that is pre-set.

18. The non-transitory computer readable storage medium of claim 15, wherein the linguistic model includes grammatical criteria for the first sequence of words and the second sequence of words.

19. The non-transitory computer readable storage medium of claim 15, wherein the similarity between a replacement word to the target word is determined based on pronunciation similarity between the replacement word and the target word.

20. The non-transitory computer readable storage medium of claim 15, wherein the similarity between a replacement word to the target word is determined based on spelling similarity between the replacement word and the target word.

* * * * *